(12) United States Patent
Turner

(10) Patent No.: US 10,189,606 B2
(45) Date of Patent: Jan. 29, 2019

(54) DRINKING OR EATING VESSEL

(71) Applicant: AT Promotions LTD, King's Lynn, Norfolk (GB)

(72) Inventor: Alexander Edward Turner, Great Massingham (GB)

(73) Assignee: AT Promotions LTD, Kings Lynn, Norfolk (GB)

( * ) Notice: Subject to any disclaimer, the term of this patent is extended or adjusted under 35 U.S.C. 154(b) by 0 days.

(21) Appl. No.: 15/832,599

(22) Filed: Dec. 5, 2017

(65) Prior Publication Data

US 2018/0155082 A1    Jun. 7, 2018

Related U.S. Application Data

(63) Continuation of application No. 15/307,794, filed as application No. PCT/GB2015/051252 on Apr. 29, 2015, now Pat. No. 9,856,055.

(30) Foreign Application Priority Data

Apr. 29, 2014    (GB) .................................. 1407546.9

(51) Int. Cl.
| | |
|---|---|
| B65D 25/34 | (2006.01) |
| G03G 7/00 | (2006.01) |
| A47G 19/02 | (2006.01) |
| A47G 19/22 | (2006.01) |
| B05D 1/02 | (2006.01) |
| B05D 1/18 | (2006.01) |
| G03G 15/00 | (2006.01) |

(52) U.S. Cl.
CPC ........... B65D 25/34 (2013.01); A47G 19/025 (2013.01); A47G 19/2227 (2013.01); B05D 1/02 (2013.01); B05D 1/18 (2013.01); G03G 7/0093 (2013.01); G03G 15/00 (2013.01)

(58) Field of Classification Search
CPC ...... B65D 25/34; C03G 7/0093; C03G 15/00; A47G 19/025; A47G 19/2227; B05D 1/18; B05D 1/02
See application file for complete search history.

(56) References Cited

U.S. PATENT DOCUMENTS

| | | | |
|---|---|---|---|
| 4,966,815 | A | 10/1990 | Hare |
| 4,993,987 | A | 2/1991 | Hull et al. |
| 5,246,518 | A | 9/1993 | Hale |
| 5,286,706 | A | 2/1994 | Mochizuki et al. |
| 5,643,387 | A | 7/1997 | Berghauser et al. |
| 6,217,694 | B1 | 4/2001 | Taniguchi |
| 9,856,055 | B2 | 1/2018 | Turner |
| 2005/0191569 | A1 | 9/2005 | Aylward et al. |
| 2011/0250405 | A1 | 10/2011 | Sawatsky |
| 2017/0050766 | A1 | 2/2017 | Turner |

FOREIGN PATENT DOCUMENTS

| | | |
|---|---|---|
| CN | 101305884 | 11/2008 |
| CN | 201542291 | 8/2010 |
| CN | 201612433 | 10/2010 |
| CN | 202009965 | 10/2011 |
| DE | 40 11 215 | 10/1990 |
| EP | 0 227 092 | 7/1987 |
| EP | 0 350 534 | 1/1990 |
| EP | 0 420 986 | 4/1991 |
| EP | 0 474 355 | 3/1992 |
| EP | 0 514 631 | 11/1992 |
| EP | 0 543 441 | 5/1993 |
| EP | 0 587 148 | 3/1994 |
| EP | 0 672 542 | 9/1995 |
| EP | 0 721 848 | 7/1996 |
| EP | 1 024 180 | 6/2000 |
| EP | 1344760 | 9/2003 |
| GB | 2484774 A | 4/2012 |
| JP | 5-278745 | 10/1993 |
| JP | 8-333139 | 12/1996 |
| JP | 2004123462 | 4/2004 |
| KR | 20010078990 | 8/2001 |
| KR | 20080079832 | 9/2008 |
| WO | 2000/53413 | 3/2000 |
| WO | 2007/027710 | 3/2007 |
| WO | 2013/160630 | 10/2013 |
| WO | 2015/166244 | 11/2015 |
| WO | 2016/102963 | 6/2016 |

OTHER PUBLICATIONS 12 pages, Jul. 27, 2017, U.S. Appl. No. 14/396,923.
12 pages, Dec. 20, 2017, U.S. Appl. No. 14/396,923.
Database WPI Accession No. 1997-095320, Jan. 3, 2013.
International Search Report dated Jan. 24, 2013 for PCT Application No. PCT/GB2012/050900, 3 pages.
GB Intellectual Property Office Search Report dated Jan. 10, 2012 for GB Application No. GB1115663.5, 2 pages.
GB Intellectual Property Office Search Report dated Oct. 20, 2014 for GB Application No. GB1407546.9, 5 pages.

(Continued)

*Primary Examiner* — Michael C Miggins
(74) *Attorney, Agent, or Firm* — Evan Law Group LLC

(57) ABSTRACT

There is provided a drinking or eating vessel comprising an inner surface that defines a volume for receiving liquid or solid food and an outer surface that supports a polymeric coating and a decorative layer, wherein the polymeric coating comprises a polymer formed by curing a coating mixture on the outer surface of the drinking or eating vessel, said coating mixture comprising a matting agent, wherein the polymeric coating has an inner surface in contact with the drinking or eating vessel and an outer surface in contact with the decorative layer, and wherein the decorative layer comprises a dry toner image applied to the outer surface of the polymeric coating. Also provided is a corresponding process for producing the drinking or eating vessel.

20 Claims, No Drawings

(56) References Cited

OTHER PUBLICATIONS

International Search Report and Written Opinion dated Mar. 3, 2016 for PCT Application No. PCT/GB2015/054134, 10 pages.
European Community Design Registration No. 02305375-0001, (Sep. 9, 2013).
European Community Design Registration No. 02305375-0002, (Sep. 9, 2013).
European Community Design Registration No. 02305375-0003, (Sep. 9, 2013).
4 pages, Jan. 24, 2013, PCT/GB2012/050900.
5 pages, Apr. 28, 2014, PCT/GB2012/050900.
6 pages, Aug. 26, 2014, PCT/GB2012/050900.
4 pages, Jan. 10, 2012, GB1115663.5.
4 pages, May 23, 2014, GB1115663.5.
4 pages, Dec. 10, 2014, GB1115663.5.
10 pages, Mar. 3, 2016, PCT/GB2015/054134.
5 pages, Dec. 23, 2016, PCT/GB2015/054134.
5 pages, Mar. 1, 2017, 15 723 281.0.
3 pages, Mar. 17, 2017, 15 723 281.0.
8 pages, Apr. 12, 2017, PCT/GB2015/054134.
8 pages, May 8, 2017, U.S. Appl. No. 14/396,923.
U.S. Appl. No. 14/396,923, filed May 14, 2015, PCT/GB2012/050900, Apr. 24, 2012.
U.S. Appl. No. 15/539,062, filed Jun. 22, 2017, PCT/GB2015/054134, Feb. 22, 2015.

DRINKING OR EATING VESSEL

The present invention relates to drinking or eating vessels having a decorative layer, and to processes for producing such vessels.

Drinking and eating vessels made from hard surface substrates such as earthenware, ceramic or glass are often decorated, for example with a decorative pattern or with an image such as a photographic image. Known decoration processes include silk screen printing, either directly to the substrate or via decals. As these decoration processes require large runs to justify the set-up cost, alternative processes have been developed to accommodate short runs and personalisation of substrates. One such process is sublimation, which requires a polymeric coating on the surface of the substrate to allow the image pigments to migrate into. Decorated products obtained by this process have relatively good resistance to mechanical abrasion. Another such process is heat transfer of dry toner images. This process also requires a polymeric coating on the surface of the substrate, but the resistance of the resulting decorated products to mechanical abrasion is relatively poor.

There is therefore a need for a process for dry toner image application which improves the resistance to mechanical abrasion and the overall durability of the decoration on the substrate/product.

The present invention addresses the above-described problem by providing drinking or eating vessels having a decorative layer, and processes for producing said vessels, according to the present claims.

In one aspect, the invention provides a drinking or eating vessel comprising an inner surface that defines a volume for receiving liquid or solid food and an outer surface that supports a polymeric coating and a decorative layer, wherein the polymeric coating comprises a polymer formed by curing a coating mixture on the outer surface of the drinking or eating vessel, said coating mixture comprising a matting agent, wherein the polymeric coating has an inner surface in contact with the drinking or eating vessel and an outer surface in contact with the decorative layer, and wherein the decorative layer comprises a dry toner image applied to the outer surface of the polymeric coating.

The term "drinking or eating vessel" includes vessels such as cups, mugs, bowls, and plates. The term "drinking or eating vessel" also includes storage vessels (for example, bottles and jars) of the type from which food products may be directly consumed.

The drinking or eating vessel may be made of any suitable material known in the art and may be of any suitable shape and design known in the art. In one embodiment, the vessel is a ceramic vessel. By way of example, the vessel may be made from bone china, porcelain, ceramics or stoneware. In one embodiment, the vessel is a glass vessel. The drinking or eating vessel may also be made of metal, for example steel (e.g. stainless steel) or aluminium.

The vessel has an inner surface and an outer surface. The inner surface is found on the inside (during normal use) of the vessel, namely the portion in which liquid or solid food is received or held, or on which said food is supported. The outer surface is found on the external side (during normal use) of the vessel before any coating process of the invention has been applied. The outer surface includes the external surface provided by the body of a vessel and may include the external surface of any appendage (e.g. a handle) thereto.

The vessels of the invention have a polymeric coating. A coating is a layer of material that is applied onto a surface of the vessel. The polymeric coating may be applied to an outer surface of the vessel, or to an inner surface of the vessel, or to both an outer and an inner surface of the vessel.

The polymeric coating may be applied in any suitable and appropriate manner, for example by spray coating or by dip coating. Suitable spray coating processes include High Volume Low Pressure (HVLP) spray application.

The polymeric coating may be a clear, colourless, transparent or translucent coating. Alternatively, the coating may be a coloured coating, for example to produce a coloured vessel in a corporate colour of a company.

The polymeric coating of the vessel may be cured onto the outer surface (and/or inner surface) of the drinking vessel at a curing temperature of less than 600° C., for example less than 400° C. or less than 300° C. Suitable polymers are well known to a skilled person.

In one embodiment, the coating is a coating that is produced by curing at a temperature of 180-240° C.

"Cured" and "curing" refers to the chemical process of curing, via which process a composition (typically containing monomers or small polymers) hardens (for example, due to the formation of cross-linking) when exposed to heat, air, ultraviolet radiation, infrared radiation or chemical additives. Thus, the coating may be produced by curing a coating mixture to form a hardened coating.

Thus, in one embodiment, the polymeric coating is produced by applying a coating mixture to a vessel followed by curing of the coating mixture at a temperature conducive to coating formation. A "coating mixture" comprises (or consists of) the ingredients that cure to form a coating on a vessel.

In one embodiment, the polymeric coating comprises (or consists of): (i) a polymer formed at a curing temperature of less than 250° C., and (ii) a matting agent.

The polymer is a non-glass polymer.

For example, the coating may comprise (or consist of): (i) one or more of: a polyurethane (lacquer or paint), an epoxy (resin), a polyester, an acrylic, or mixtures thereof, and (ii) a matting agent. An epoxy may be a thermosetting copolymer that is formed by the reaction between an epoxide and a polyamine. The coatings may be provided as, for example, a water-based coating mixture or a solvent-based coating mixture.

In one embodiment, the coating comprises a cured polyurethane and/or a cured epoxy (resin). For example, the coating may comprise (or consist of): (i) polyurethane, and (ii) a matting agent. In one embodiment, the coating comprises (or consists of): (i) an epoxy, and (ii) a matting agent.

For example, the coating may comprise (or consist of): (i) a polymeric blocked aliphatic diisocyanate epoxy, or an aliphatic (acrylic) polyurethane, and (ii) a matting agent.

A typical epoxy (resin) composition may comprise (or consist of):

polyisocyanate (e.g. an aliphatic diisocyanate based polyisocyanate), for example 5-30 wt. %;

propylene glycol or ether acetate (e.g. a propylene glycol monomethyl ether acetate), for example 10-40 wt. %);

xylene (CAS No. 1330-20-7), for example 1-15 wt. %;

an organic solvent (e.g. solvent naptha), for example 1-10 wt. %;

an epoxy resin (for example, 5-20 wt. %).

Where wt. % values are indicated, said composition components add up to 100%.

An example of an epoxy (resin) composition comprises (or consists of):

methyl ethyl ketoxime-blocked aliphatic diisocyanate based polyisocyanate ≤30 wt %;

propylene glycol monomethyl ether acetate (CAS No. 108-65-6)≤40 wt %;

xylene (CAS No. 1330-20-7)≤15 wt %;

aromatic 100 (solvent naptha) (CAS No. 64742-95-6)≤10 wt %;

epoxy resin ≤20 wt %.

Where wt. % values are indicated, said composition components add up to 100%.

By way of specific example, reference is made to DuraGlaze, which is a polymeric blocked aliphatic diisocyanate epoxy resin.

Thus, the coating may comprise (of consist of): (i) DuraGlaze, and (ii) a matting agent.

A further example of an epoxy coating is Slotogard, which may be obtained from Schloetter Co Ltd, Abbey Works, New Road, Pershore, Worcs, UK.

A yet further example of an epoxy coating comprises (or consists of):

an ethanol component (e.g. 2-(2-butoxyethoxy)ethanol), e.g. 5-15 wt. %;

an organic solvent component (e.g. xylene), e.g. 25-50 wt. %;

a butanol component (e.g. n-butanol), e.g. 5-15 wt. %;

epoxy resin (e.g. number average molecular weight≤700), e.g. >50 wt. %.

Where wt. % values are indicated, said composition components add up to 100%.

An example of a suitable epoxy coating is Ceraglaze S1475, which may be obtained from Neogene LLP, Watford, Hertfordshire, United Kingdom.

By way of example, epoxy coatings such as Ceraglaze S1475 typically cure in 8-14 minutes at a temperature of 180-240° C.

Further examples of a polyurethane coating are Uraflex, and Polysil SCW 700 Series, which may both be obtained from Schloetter Co. Ltd, Abbey Works, New Road, Pershore, Worcs, UK.

The coating may comprise an organic coating, such as a Transparent Stoving Finish (TSF). By way of example, a TSF may be a blend of polyurethane and epoxy resin.

A typical TSF may comprise (or consist of):

2-methoxy-1-methylethyl acetate (CAS No. 108-65-6) 5-15%;

n-butyl acetate (CAS No. 123-86-4) 5-15%;

xylene (CAS No. 1330-20-7) 25-50%;

ethylbenzene (CAS No. 100-41-4) 5-15%;

epoxy resin (number average molecular weight≤700) (CAS No. 25068-38-6) 1-5%.

Where wt. % values are indicated, said composition components add up to 100%.

Commercially available examples of TSFs are available from Neogene LLP, Watford, Hertfordshire, United Kingdom, such as TSF product code S1805.

The coating may comprise (or consist of): (i) a polyester, and (ii) a matting agent. An example of a polyester coating is Polysil SCW 800 Series, which may be obtained from Schloetter Co Ltd, Abbey Works, New Road, Pershore, Worcs, UK.

Other coating materials may be employed and are well known to a skilled person.

The polymeric coating may include a silica matting agent, but it is not a glass layer. For example, the polymeric coating of the present invention is not one that is obtained by glazing, which refers to heating a coating mixture at a temperature greater than 650° C. (for example, 1210° C.).

The polymeric coating may be a coating which is resistant to damage when the coated vessel is washed (for example, by hand, or in a dishwasher). Examples of such coatings include polyurethane lacquers/paints, epoxy resins and polymeric blocked aliphatic diisocyanate epoxy resins (e.g. DuraGlaze as described above).

The coated vessels of the invention comprise a decorative layer. A decorative layer comprises a decoration which covers all or part of a surface (typically at least part of the outer and/or inner surface) of the vessel, and may provide an aesthetic effect for the user.

The decorative layer may be a pattern or an image such as a photographic image. The decorative layer may be coloured. Thus, by way of example, the decorative layer may comprise patterns, texts, logos, advertisements, or other designs (e.g. corporate branding or trademarks), or combinations thereof. The decorative layer may comprise an image or images, such as pictures or photographic images.

The decorative layer may cover part of a surface of the drinking or eating vessel. Alternatively, the decorative layer may cover all of a surface of the drinking or eating vessel. A decorative layer may be applied to an outer surface, or to an inner surface (or to both), of a drinking or eating vessel.

A suitable technique for producing a decorative layer in accordance with the present invention is dry toner heat transfer printing.

In dry toner heat transfer printing, the decoration that is to form the decorative layer is first printed onto a hard surface transfer paper using a laser printer, which forms an image on the paper using dry toner. Dry toner is applied to the paper as a powder, before the application of heat and pressure is used to bind the toner to the paper. The printed paper may then be cut to the desired size before being placed onto the outer surface of the vessel on which the decorative layer is to be formed. The toner image is then transferred onto the surface of the vessel through the application of heat, for example between 120 and 180 degrees Celsius; this may be achieved using a heat press. The application of heat softens polymers in the toner, enabling them to adhere to and chemically bond with the surface of the vessel.

Dry toner as used in the above-described process of dry toner heat transfer printing may comprise a polymeric binder component and a colorant/pigment component. Dry toner may optionally comprise further additives. By way of example, a dry toner may comprise approximately 90% polymeric binder, 4 to 8% colorants/pigments and 2-6% additives. Examples of polymeric binders used in dry toner include polyesters and styrene/acrylic copolymers.

In one embodiment, the dry toner comprises a polyester component.

Conventional polymeric coatings used in the heat transfer of dry toner images to hard surface substrates have a gloss finish. As described above, decorated products obtained using such coatings have relatively poor resistance to mechanical abrasion. However, the inclusion of a matting agent in the polymeric coating, in accordance with the present invention, has been found to improve the resistance to mechanical abrasion and the overall durability of the decorative layer. Without wishing to be bound by theory, it is believed that adhesion between the polymeric coating and the printer toner is improved because the presence of the matting agent in the polymeric coating provides an increased surface area for the toner to bond with. It is also believed that the strength of the chemical bonding process between the toner and the polymeric coating is increased.

In one embodiment, the matting agent comprises (or consists of) silica particles. For example, the matting agent may comprise (or consist of) fumed silica.

In one embodiment, the matting agent comprises (or consists of) fumed silica having an average particle size of 4-8 (e.g. 5-6) μm.

An example of a suitable silica matting agent is SYLOID® ED 30, having an average particle size of 5.0-6.0 μm, a pH of 6.0-8.5, a pore volume of 1.8 ml/g and a surface treatment of 10% wax, which may be obtained from Neogene LLP, Watford, Hertfordshire, United Kingdom.

In one aspect, the invention provides a process for producing a drinking or eating vessel having a decorative layer, wherein the vessel comprises an inner surface that defines a volume for receiving liquid or solid food and an outer surface that supports a polymeric coating and a decorative layer, said process comprising the steps of:

providing a coating mixture comprising a matting agent, applying the coating mixture to the outer surface of the drinking or eating vessel, curing the coating mixture to form a polymeric coating having an inner surface and an outer surface, said inner surface being in contact with the outer surface of the drinking or eating vessel, and applying a dry toner image to the outer surface of the polymeric coating to form said decorative layer.

In one embodiment, the coating mixture is cured at a temperature of less than 250° C., or at a temperature in the range of 150-300° C. (e.g. in the range of 180-240° C.).

The coating mixture may be cured for a period of time of between 1 and 30 minutes, for example, 5-25 minutes, 5-20 minutes, 5-15 minutes, or 5-10 minutes.

In certain embodiments, the curing process requires heat. The heat required for the curing process may be provided by, for example, infrared radiation (such as in an infrared oven), or by convection (such as in a convection oven). Alternatively, curing may be effected by air in a process of air curing.

In one embodiment, the coating mixture comprises the matting agent in an amount of 1-50 g per liter of coating mixture, for example in an amount of 5-30 g per liter, 10-20 g per liter, or 14-16 g per liter of coating mixture.

The coating mixture may further comprise talc powder (e.g. 10 micron talc powder). In one embodiment, the ratio of the amount of talc powder to the amount of matting agent present in the coating mixture is in the range from 0:1 to 1:1 by weight, for example 1:3 to 2:3 by weight, or about 1:2 by weight. For example, the coating mixture may comprise talc powder and fumed silica in a ratio of talc powder to fumed silica of about 1:2 by weight.

In one further aspect, the invention provides a drinking or eating vessel obtainable by a process as hereinbefore described.

The temperature values/ranges described herein with reference to the drinking or eating vessel aspect apply equally to the coating step of the process aspect.

Reference herein to "liquid or solid food" embraces any item that a mammal (e.g. a human) might drink or eat. Said item may have any (including zero) calorific value.

Reference herein to "an inner surface that defines a volume for receiving liquid or solid food" embraces any structure that is capable of supporting a liquid or solid food item. Said structure may include plates and plate-like articles of manufacture (whether flat or curved in vertical cross-section), and bowls or bowl-like articles of manufacture (whether capable of retaining liquid or not).

Reference herein to "supports" simply indicates that a polymeric coating has been applied to the outer (and/or inner) surface of the vessel. Thus, the polymeric coating may directly contact the outer (and/or inner) surface and/or may be separated therefrom by one or more intervening layers/coatings.

In one embodiment, the coating does not comprise (or consist of) any one or more of polyurethane acrylic ester, benzoin ethyl ester, dimethyl ethanolamine, silica tourmaline, or silica nano-silver.

Embodiments of the invention will now be described solely by way of example.

EXAMPLE

A coating mixture comprising a matting agent is prepared by blending fumed silica into a coating mixture at a concentration of approximately 15 g fumed silica per liter of coating mixture. In this example, SYLOID® ED 30 fumed silica is mixed with Ceraglaze S1475, a two component solvent based thermocure epoxy.

The coating mixture as prepared above is applied to a drinking vessel (a ceramic mug) using a High Volume Low Pressure (HVLP) spray.

The coating mixture is cured onto the mug using heat at a temperature of 180-240° C. for 5-10 minutes.

The coated mug is allowed to cool.

A desired image is printed using dry toner onto a hard surface transfer paper (for example, a Magic Touch® CPM paper) using a laser printer (for example, an OKI C711WT laser printer). The printed paper is cut to size.

The printed paper is applied to the surface of the mug, and the assembly placed into a heat press. The heat press applies pressure and a temperature of 120-180° C. for a period of between 30 seconds and 2 minutes. The heat softens the polymers in the toner and allows them to bond with the coated surface of the mug, thus transferring the image from the paper to the mug.

The assembly is allowed to cool, following which the transfer paper is removed from the mug, leaving the image formed onto the mug as a decorative layer.

The decorative layer is highly resistant to abrasion and the mug can be washed in a dishwasher for at least 100 cycles with no significant deterioration of the decorative layer.

The invention claimed is:

1. A drinking or eating vessel comprising an inner surface that defines a volume for receiving liquid or solid food and an outer surface that supports a polymeric coating and a decorative layer, wherein the polymeric coating comprises a polymer formed by curing a coating mixture on the outer surface of the drinking or eating vessel, said coating mixture comprising a matting agent, the polymeric coating has an inner surface in contact with the drinking or eating vessel and an outer surface in contact with the decorative layer, and the decorative layer comprises a dry toner image applied to the outer surface of the polymeric coating.

2. The drinking or eating vessel of claim 1, wherein said vessel comprises ceramic and/or glass.

3. The drinking or eating vessel of claim 1, wherein the polymeric coating comprises: (i) a polymer selected from: a polyurethane, an epoxy, a polyester, an acrylic, or mixtures thereof, and (ii) said matting agent.

4. The drinking or eating vessel of claim 1, wherein the coating mixture comprises talc powder, and the ratio of talc powder to matting agent present in the coating mixture is in the range of 1:3 to 1:1 by weight.

5. The drinking or eating vessel of claim 1, wherein the concentration of the matting agent is at least 1 g/L of coating mixture.

6. The drinking or eating vessel of claim 1, wherein the concentration of the matting agent is 1-50 g/L of coating mixture.

7. The drinking or eating vessel of claim 1, wherein the presence of the matting agent in the polymeric coating provides an increased surface area for the toner to bond with.

8. The eating or drinking vessel of claim 1, wherein the matting agent comprises particles having an average particle size of 4-8 μm.

9. The drinking or eating vessel of claim 1, wherein said vessel comprises ceramic and/or glass, and
the polymeric coating comprises: (i) a polymer selected from: a polyurethane, an epoxy, a polyester, an acrylic, or mixtures thereof, and (ii) said matting agent.

10. The drinking or eating vessel of claim 9, wherein the coating mixture comprises talc powder, the ratio of talc powder to matting agent present in the coating mixture is in the range of 1:3 to 1:1 by weight, the concentration of the matting agent is at least 1 g/L of coating mixture, and the matting agent comprises particles having an average particle size of 4-8 μm.

11. A process for producing a drinking or eating vessel having a decorative layer, wherein the vessel comprises an inner surface that defines a volume for receiving liquid or solid food and an outer surface that supports a polymeric coating and a decorative layer, said process comprising:
providing a coating mixture comprising a matting agent,
applying the coating mixture to the outer surface of the drinking or eating vessel,
curing the coating mixture to form a polymeric coating having an inner surface and an outer surface, said inner surface being in contact with the outer surface of the drinking or eating vessel, and
applying a dry toner image to the outer surface of the polymeric coating to form said decorative layer.

12. The process of claim 11, wherein the coating mixture comprises the matting agent in an amount of 10-20 g per liter of coating mixture.

13. The process of claim 11, wherein the coating mixture is applied by spray coating or by dip coating.

14. The process of claim 11, wherein the coating mixture is cured at a temperature of less than 600° C.

15. The process of claim 11, wherein the coating mixture is cured at a temperature in the range of 180-240° C.

16. The process of claim 11, wherein the polymeric coating comprises: (i) a polymer selected from: a polyurethane, an epoxy, a polyester, an acrylic, or mixtures thereof, and (ii) said matting agent.

17. The process of claim 11, wherein the dry toner image is applied by heat transfer of a dry toner image from a transfer paper, and/or wherein the dry toner image is printed on the transfer paper by laser printing.

18. A drinking or eating vessel prepared by the process of claim 11.

19. The process of claim 11, wherein the coating mixture comprises the matting agent in an amount of 10-20 g per liter of coating mixture, the coating mixture is applied by spray coating or by dip coating, and the coating mixture is cured at a temperature in the range of 180-240° C.

20. A method of making an eating or drinking vessel, having an inner surface that defines a volume for receiving liquid or solid food and an outer surface that supports a polymeric coating, comprising:
applying a dry toner image to the polymeric coating to form a decorative layer, wherein the polymeric coating comprises a matting agent.

* * * * *